(12) United States Patent
Fukasawa

(10) Patent No.: US 7,259,922 B2
(45) Date of Patent: Aug. 21, 2007

(54) LIGHT AMOUNT-ADJUSTING DEVICE AND LIGHT AMOUNT-ADJUSTING DEVICE FOR PROJECTOR UNIT

(75) Inventor: Kazuhiro Fukasawa, Yamanashi-ken (JP)

(73) Assignee: Nisca Corporation, Minamikoma-gun, Yamanashi-ken (JP)

( * ) Notice: Subject to any disclaimer, the term of this patent is extended or adjusted under 35 U.S.C. 154(b) by 12 days.

(21) Appl. No.: 11/358,142

(22) Filed: Feb. 22, 2006

(65) Prior Publication Data
US 2006/0276072 A1   Dec. 7, 2006

(30) Foreign Application Priority Data
Jun. 6, 2005   (JP) .............................. 2005-165898
Jun. 6, 2005   (JP) .............................. 2005-165899

(51) Int. Cl.
G02B 9/00   (2006.01)
G02B 9/08   (2006.01)
G03B 9/08   (2006.01)

(52) U.S. Cl. ....................... 359/738; 396/452; 396/449

(58) Field of Classification Search ........ 359/738–740; 396/449, 450, 452, 461, 484, 501, 246–249
See application file for complete search history.

(56) References Cited

U.S. PATENT DOCUMENTS 5,997,187 A * 12/1999 Hamasaki .................... 396/449
6,811,331 B2 * 11/2004 Iwasa .......................... 396/449
6,853,810 B1 * 2/2005 Fujinaga ...................... 396/449

FOREIGN PATENT DOCUMENTS

JP   2003-57715   2/2003

* cited by examiner

*Primary Examiner*—Alicia M Harrington
(74) *Attorney, Agent, or Firm*—Manabu Kanesaka

(57) ABSTRACT

A light amount-adjusting device has a base plate with an optical path aperture, first and second blade members, and a driving unit for swinging open and close the blade members. Each blade member has a base-end portion and a front-end portion. The base-end portion is pivotally held on the base plate. The front-end portion faces the aperture. First and second boss-like protrusions project from the base plate and from the surfaces of the blade members. The protrusions are coupled to define the heightwise positions of the blade members in the direction of the optical axis. The vertically overlapping blade members pivotally supported on the base plate can be swung open and closed without interfering with each other. The device produces less frictional load when the aperture is opened and closed, and thus less noise.

10 Claims, 19 Drawing Sheets

LIGHT AMOUNT-ADJUSTING DEVICE AND LIGHT AMOUNT-ADJUSTING DEVICE FOR PROJECTOR UNIT

BACKGROUND OF THE INVENTION AND RELATED ART STATEMENT

The present invention relates to a light amount-adjusting device for use in an imaging device such as a camera or in a projecting device such as a projector. More particularly, the invention relates to a light amount-adjusting device such as an aperture device for adjusting the light amount in an optical path or a shutter device for blocking the light amount. The invention also relates to a light amount-adjusting device for use in a projector unit using such a device.

Generally, a light amount-adjusting device of this kind is widely known as a device which is incorporated in a lens barrel such as an imaging lens or projector lens and which is used to adjust the amount of light according to the circumstances of use. A related art device of this kind has been so configured that one or more blades are mounted in a base plate provided with an aperture formed in an optical path. The blades are swung open and closed by a driving motor, thus performing a shutter operation or an operation, for restricting the amount of light.

Such a light amount-adjusting device has a base plate molded from a synthetic resin, as disclosed, for example, in a patent reference JP-A-2003-57715. Shaft pins are mounted on the base plate. Base-end portions of plural blade members are securely supported to the shaft pins. The blade members are arranged at a given interval around the aperture. Front-end portions of the blade members stop down the aperture to a variable extent or shut off the aperture by rotating the blade members by the same amount. A holding plate is mounted like a cover over the base plate. The blade members are positioned between the base plate and the holding plate so as to be capable of being swung open and closed.

Where the plural blade members are superimposed like fish scales over the base plate forming the aperture in the optical path as described above and are swung open and closed, the following structure has been heretofore adopted. A second blade is stacked on a first blade, and then the holding plate is placed on the topmost blade. Therefore, the blades superimposed vertically frequently interfere with each other, resulting in malfunction. Especially, if the blades are distorted by temperature or external shock, the blades mesh with each other, making the device inoperative. Another problem is that friction between the blades hinders them from being smoothly swung open and closed.

Accordingly, a structure having a base plate with rib-like protrusions which support the first and second blades, respectively, is known as disclosed in the above-cited patent reference. A difference in heightwise position corresponding to the thickness of each blade is created between the two protrusions. However, if the protrusions that alleviate the interference (friction) between the blades are formed on the base plate supporting the blades in this way, the following problem arises. Where the blades are made of metal sheet less affected by temperature variations and undergoing less aging variations, for example, the blades themselves are large in mass. If an attempt is made to swing open and closed the blades at high speed, the blades are swung up and down perpendicularly to the longitudinal direction of the blades by vibrations. Consequently, the operation is unstable and generates noise. Also, malfunction may occur.

In view of the foregoing mutual motion between the blades, it is a main object of the invention to provide a light amount-adjusting device which prevents plural blades superimposed vertically from interfering with each other to thereby prevent failure of operation. The light amount-adjusting device also prevents the blades from producing noise when swung open and closed. In the light amount-adjusting device, low frictional load occurs when the blades are swung open and closed.

Further objects and advantages of the invention will be apparent from the following description of the invention and the associated drawings.

SUMMARY OF THE INVENTION

To achieve the above-described object, the invention adopts the following structure. A light amount-adjusting device according to a first aspect of the invention has a base plate, at least two blade members including first and second blade members, and driving means for swinging open and closed the blade members. The base plate is provided with an aperture in an optical path for imaging light or projection light. Each of the blade members has a base-end portion pivotally supported on the base plate. Each blade member also has a front-end portion facing the aperture in the optical path. In this structure of a light amount-adjusting device, first and second protrusions project like bosses from the surface of the base plate and from the surfaces of the blades, respectively, when the blade members are pivotally supported on the base plate. The first and second protrusions are coupled together to define the heightwise positions of the blade members in the direction of the optical axis. At the same time, pin-like shaft members are mounted to the first protrusions or second protrusions. Bearing holes in which the shaft members are securely supported are formed in the second protrusions or first protrusions. The blade members are pivotally supported on the base plate so as to be swingable open and closed.

The heightwise position of the first and second protrusions defining the heightwise position of the first blade members is made different from the heightwise position of the first and second protrusions defining the heightwise position of the second blade members. This difference in heightwise position is set based on the thickness of the blade members. Because of this structure, each blade member has a base-end portion equipped with a bearing portion on which the boss-like protrusion is formed. The mass of the blade member is distributed mainly in the base-end portion. The blade member swings open and closed about this base-end portion. Consequently, stable motion can be expected.

A second aspect of the invention is based on the first aspect described above, wherein the first and second blade members have their respective front-end portions facing the aperture in the optical path. The first and second blade members are placed over the base plate so as to overlap each other up and down in the direction of the optical axis. The difference in heightwise position between the first and second protrusions in the direction of the optical axis defining the heightwise position of each blade member is made substantially equal to the thickness of each blade member.

A third aspect of the invention is based on the first aspect described above, wherein each of the blade members is pressed out of metal plate or sheet and that a sleeve-like pedestal member is crimped against or otherwise coupled to the base-end portion of each blade member, forming the second protrusion by the pedestal member. The blade mem bers are easy to fabricate. Furthermore, the blade members can be fabricated under conditions where the mass balance between the protrusions formed from the pedestal member and the durability (wear-resistance) are enhanced.

A fourth aspect of the invention is based on the first aspect described above, wherein the base plate has a protrusive flange supporting the front end of each of the first and second blade members on the fringe of the aperture in the optical path and that the flange has first and second support surfaces making sliding contact with the first and second blade members, respectively. Steps which are different in heightwise position in the direction of the optical axis are formed on the first and second support surfaces. This assures that the base-end portion of each blade member is supported by the protrusions and the front-end portion is supported by the steps created on the flange in the aperture. The overlapping blades do not interface with each other.

A fifth aspect of the invention is based on the first aspect described above, wherein there is provided a holding plate parallel to the base plate at a given space with the base plate. Rib-like protrusions for guiding swinging motion of the first and second blade members are formed on the holding plate. The rib-like protrusions for guiding the first blade members and the rib-like protrusions for guiding the second blade members are made different in heightwise position.

A sixth aspect of the invention provides a projector unit having a liquid crystal panel or other imaging means, a light source for illuminating the imaging means with light, and projection means for projecting the light from the imaging means. In this structure, the projection means is composed of a lens unit for projecting the light from the imaging means onto a screen and a light amount-adjusting device incorporated in the lens unit. The light amount-adjusting device has a base plate provided with an aperture in an optical path, at least two blade members including first and second blade members, and driving means for swinging open and close the blade members. Each of the first and second blade member's has a base-end portion pivotally supported on the base plate and a front-end portion facing the aperture in the optical path.

When the blade members are pivotally supported on the base plate, the first protrusions projecting like bosses from the surface of the base plate are formed on the base plate. The second protrusions projecting like bosses from the surfaces of the blade members are formed on the blade members. The first and second protrusions are joined together to define the heightwise positions of the blade members in the direction of the optical axis. Pin-like shaft members are mounted on the first protrusions or second protrusions. Bearing holes in which the shaft members are securely supported are formed in the second protrusions or first protrusions. The heightwise position of the first and second protrusions defining the heightwise position of the first blade members is made different from the heightwise position of the first and second protrusions defining the heightwise position of the second blade members.

The light amount-adjusting device is made up of first and second light amount-limiting means spaced from each other on the lens unit. The first light amount-limiting means is made of the base plate having the given aperture that limits the amount of light, the aperture being placed in an optical path for projected light. The second light amount-limiting means is made of the light amount-adjusting device according to the first aspect.

Furthermore, the present invention has made the following improvements in addition to the features of the invention described above to provide a light amount-adjusting device having blades which are not flexed or deformed greatly when swung open and closed. This assures reliable open and close operation at all times. At the same time, during high-speed operation, the operation is performed smoothly without producing noise.

Thus, a light amount-adjusting device comprises: a base plate provided with an aperture in an optical path for imaging light or projected light; at least two blade members including first and second blade members, each of the blade members having a base-end portion and a front-end portion, the base-end portion being pivotally supported on the base plate, the front-end portion facing the aperture; a rotating transfer ring, supported by a periphery of the aperture in the optical path of the base plate; driving means for rotating the transfer ring; and first and second protrusions projecting like bosses from a surface of the base plate and from surfaces of the blade members, respectively, when the blade members are pivotally supported on the base plate.

The first and second protrusions are joined together to define heightwise positions of the blade members in the direction of an optical axis; pin-like shaft members are securely mounted over protrusions of one of the first and the second protrusions; and bearing holes in which the shaft members are securely supported are formed in protrusions of the other.

A heightwise position of the first and second protrusions defining the heightwise position of the first blade members is made different from a heightwise position of the first and second protrusions defining the heightwise position of the second blade members.

The base-end portions of the first and second blade members are rotatably and pivotally supported on the boss-like protrusions formed on the base plate; the front-end portions of the blade members are swingably supported on flange-like protruding surfaces formed at fringes of the aperture in the optical path. A shaft pin is formed integrally with a central portion of each of the blade members and protrudes toward the transfer ring, the shaft pin having a base-end portion having a stepped surface. The transfer ring is provided with slit grooves in which the shaft pins of the light amount-adjusting blades are fitted, the slit grooves having flange-like protruding surfaces at fringes of the slit grooves, the flange-like protruding surface and the stepped surface of the base-end portion of the shaft pin being slidably engaged, the flange-like protruding surfaces formed at the fringes of the slit grooves being so formed that they engage the first and second blade members at different heightwise positions.

BRIEF DESCRIPTION OF THE DRAWINGS

FIG. 6-1B is a cross section of one second blade member and the transfer ring of the device shown in FIG. 1, showing the manner in which the second blade member is coupled to the transfer,ring;

FIG. 6-1C is a cross section of one third blade member and the transfer ring of the device shown in FIG. 1, showing the manner in which the third blade member is coupled to the transfer ring;

FIG. 6-2D is a cross section different from the cross section of FIG. 6-1A, showing the manner in which the first blade member is coupled to the transfer ring of FIG. 1;

FIG. 6-2E is a cross section different from the cross section of FIG. 6-1B, showing the manner in which the second blade member is coupled to the transfer ring of FIG. 1;

FIG. 6-2F is a cross section different from the cross section of FIG. 6-1C, showing the manner in which the third blade member is coupled to the transfer ring of FIG. 1;

DETAILED DESCRIPTION OF THE PREFERRED EMBODIMENTS

Figure 1:
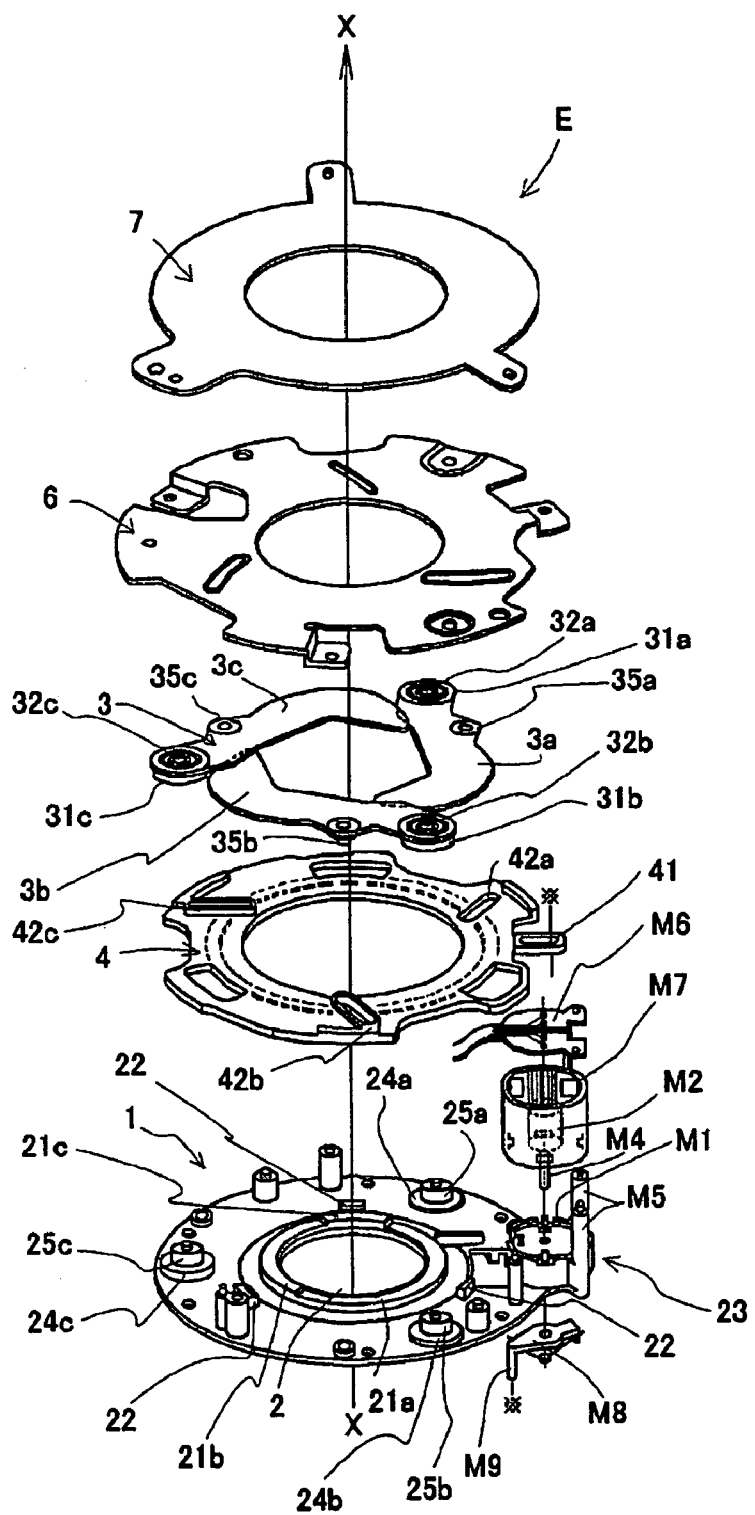
FIG. 1 is an exploded perspective view of a light amount-adjusting device in an assembled state according to one embodiment of the invention.
Figure 2:
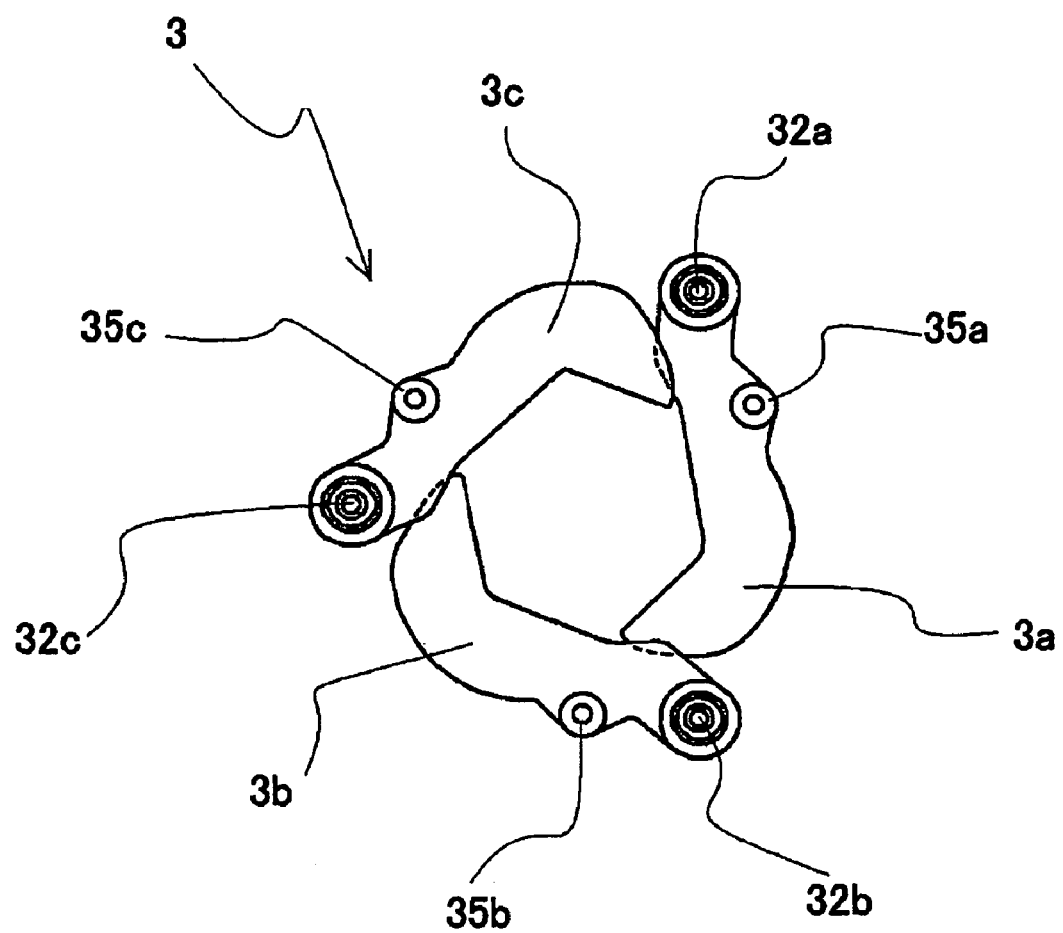
FIG. 2 is an explanatory view illustrating the structure of the blade members shown in FIG. 1.

The invention is hereinafter described in detail based on the illustrated preferred embodiments. FIG. 1 is an exploded perspective view of a light amount-adjusting device E in an assembled state according to the invention. The adjusting device E placed in an imaging optical path or projection optical path as shown in FIG. 1 includes a base plate 1 forming the frame of the device. The base plate 1 is provided with an aperture 2 in the optical path. The device further includes plural blade members 3a, 3b, and 3c (collectively indicated by numeral 3) disposed in the aperture 2 in the optical path. In addition, the device includes a driving motor M for swinging open and closed the blade members 3, a transfer ring 4 for transmitting rotation of the motor M to the blade members 3, and a holding plate 6.

The base plate 1 is made of a flat member in a circular or square form. The illustrated member having an appropriate shape is molded (e.g., injection-molded) from a heatproof synthetic resin such as LCP (liquid crystal polymer) resin or PPS (polyphenylene sulfide) resin. The base plate 1 is centrally provided with the appropriate aperture 2 in the optical path. The aperture 2 is shaped in given size substantially about the optical axis X-X of an imaging optical path, for example. A flange 21 is formed around the aperture 2 in the optical path. The invention is characterized in that the flange 21 has a stepped form to support the plural blade members 3 as described later.

The annular base plate 1 provided with the aperture 2 in the optical path has protrusions 22, a motor mounting portion 23 to which the driving motor M is mounted, and blade pivot portions 24 (24a, 24b, 24c), that are integrally molded. The protrusions 22 are used to cause the transfer ring 4 to be fitted over and supported to the outer periphery of the flange 21 around the aperture. As shown in FIG. 1, the protrusions 22 are formed at three locations. The protrusions 22 are fitted in recessed grooves formed in the transfer ring 4 (described later) to support the ring 4 such that it can rotate through a given angle. Therefore, the transfer ring 4 rotates about the optical axis X-X.

A normally well known electromagnetic motor structure or electromagnetic solenoid structure can be adopted as the driving motor M. One example of the illustrated structure of the driving motor M is described. An annular coil frame M1 is formed integrally with the resinous base plate 1. Alternatively, the frame 1M may be formed separately and attached to the base plate 1. A cylindrical magnet M2 is fitted inside the coil frame M1. The magnet M2 and a rotating shaft M4 integral with the magnet together form a rotor. A stem M5 is formed integrally with the coil frame M1. A substrate plate M6 for pivotally mounting the rotating shaft M4 is fixed to the stem M5. A printed circuit board is disposed on the substrate plate M6.

The opposite ends (upper and lower ends as viewed in the figure) of the rotating shaft M4 are rotatably supported to the bottom (base plate) of the coil frame M1 and to the substrate plate M6. A coil is wound around the outer surface of the coil frame M1. The driving motor N is integrally built in the base plate 1. A yoke M7 covers the outer surface of the coil frame M1 on which the coil is wound. A transfer arm M8 integral with the rotating shaft M4 is mounted to the rotor constructed as described above. The transfer arm M8 has a transfer pin M9 fitted in a slit groove 41 formed in the transfer ring 4. A transfer mechanism is built such that the transfer ring 4 is rotated about the optical axis X-X by rotation of the rotating shaft M4.

The blade members 3 (3a, 3b, 3c) are now described. The number of the blade members 3 is three, five, or seven, for example. In the illustrated structure, the three blade members 3a, 3b, and 3c are regularly spaced from each other around the aperture 2 in the optical path. The base-end portion of each blade member 3 is pivotally supported on the base plate 1. The front-end portion of each blade member faces the aperture 2 in the optical path.

Each of the illustrated blade members 3 having a desired shape is pressed out of metal sheet such as SK material. The surface is coated with an organic bonded black-based film in which a lubricating material and a binder material are mixed to enhance the slidability and prevent reflection of light. The blade members 3 are made of metal sheet in this way to prevent the blade members from being distorted under high ambient temperatures and to permit the blade members to withstand high-speed swinging motion.

Accordingly, in the invention, the blade members 3 as described above are supported on the base plate 1 as described below. The base plate 1 has three boss-like protrusions 24 that are the aforementioned blade pivot portions, the protrusions 24 supporting the blade members 3a, 3b, and 3c, respectively. The protrusions are located around the aperture 2 in the optical path. The boss-like protrusions (first protrusions) 24a, 24b, 24c are formed on the base plate 1. Boss-like protrusions 31a, 31b, and 31c (second protrusions) project from the surfaces of the blade members 3a, 3b, and 3c, respectively. The first and second protrusions 24 and 31 have joint surfaces which engage with each other.

That is, the heightwise positions of the blade members 3 in the direction of the optical axis are defined by joining together the first protrusions 24a, 24b, 24c protruding from the surface of the base plate 1 and the second protrusions 31a, 31b, and 31c protruding from the surfaces of the blade members 3. Pedestal members shaped like sleeves or cylinders are crimped against the blade members 3 shaped by the aforementioned press working, the blade members 3 having the second protrusions, 31a, 31b, and 31c. The boss-like second protrusions 31a, 31b, and 31c of the blade members 3 are provided with bearing holes 32a, 32b, and 32c, respectively. Pin-like shaft members 25a, 25b, and 25c fitted in the bearing holes 32, respectively, are formed integrally with the boss-like first protrusions 24a, 24b, and 24c on the base plate 1. Accordingly, with respect to the boss-like first protrusions 24 on the base plate 1 and blade members 3, the pin-like shaft members 25 are fitted in the bearing holes 32, and the blade members 3 are rotatably and pivotally held.

Figure 7A:
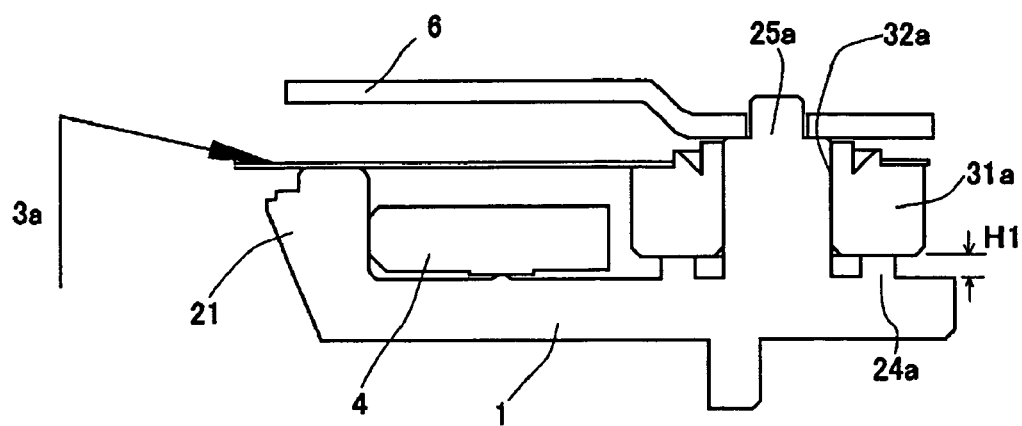
FIG. 7A is a cross section of one first blade member and the base plate of the device shown in FIG. 1, showing the manner in which the first blade member is coupled to the base plate.
Figure 7B:
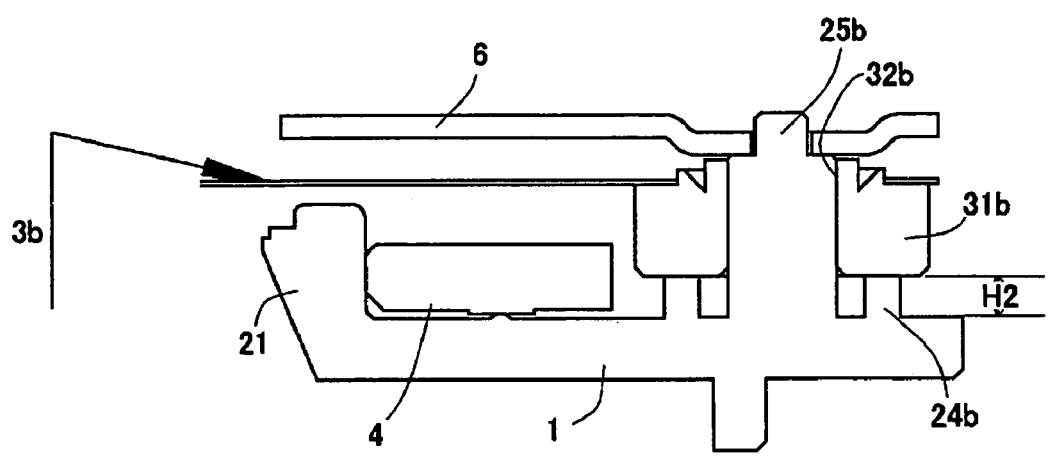
FIG. 7B is a cross section of one second blade member and the base plate of the device shown in FIG. 1, showing the manner in which the second blade member is coupled to the base plate.
Figure 7C:
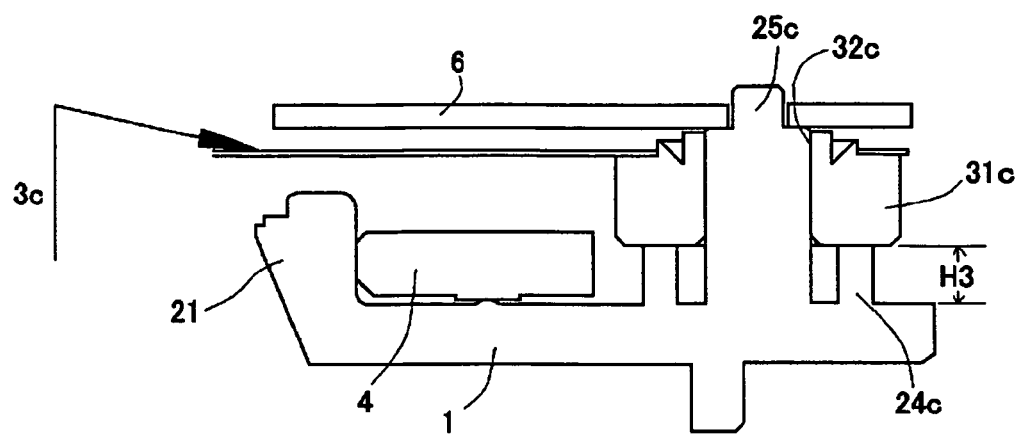
FIG. 7C is a cross section of one third blade member and the base plate of the device shown in FIG. 1, showing the manner in which the third blade member is coupled to the base plate.

This pivotal support structure is described by referring to FIGS. 7A-7C. The three boss-like first protrusions 24a, 24b, and 24c are formed on the base plate 1 and peripherally regularly spaced from each other around the aperture 2 in the optical path. The protrusions 24a, 24b, and 24c extend to heights H1, H2, and H3, respectively, from the surface of the base plate which forms the plane of the aperture 2 in the optical path. Let d be the thickness of each blade member. Relations $H3 \geq H2+d$ and $H2 \geq H1+d$ are satisfied. That is, the protrusion 24a is formed at the lowest heightwise position. The protrusion 24b is formed at a position higher than the protrusion 24a by the thickness d of the blade member. The protrusion 24c its formed at a position higher than the protrusion 24b by the thickness d of the blade member.

Rib-like protrusions 51a, 51b, and 51c are also formed on the holding plate 6 (described later). The protrusions are formed integrally with the holding plate 6 by press working such that the illustrated heights H4, H5, and H6 (see FIGS. 6-2D-6-2F) above the surface substantially satisfy relations $H4 \geq H5+d$ and $H5 \geq H6+d$ (where d is the thickness of each blade member). Accordingly, the height H1 of the protrusion 24a formed on the base plate 1, the height H2 of the protrusion 24b, and the height H3 of the protrusion 24c are made different from each other based on the thickness d of each blade member relative to the space L between the base plate 1 and the holding plate 6. At the same time, the rib-like protrusions 51a, 51b, and 51c are formed on the holding plate 6. The heights H4, H5, and H6 are set in a reverse order.

In the illustrated embodiment described so far, the heightwise positions of the boss-like first protrusions 24a, 24b, and 24c formed on the base plate 1 are made different. The boss-like second protrusions 31a, 31b, and 31c formed on the blade members 3 are made identical in heightwise position. In contrast, where the boss-like first protrusions 24a, 24b, and 24c formed on the base plate 1 are made identical (i.e., H1=H2=H3) and the heights of the protrusions formed on the blade members 3 are formed as "(the height of protrusion 31a)≦(height of protrusion 31b)+d≦(height of protrusion 31c)+d", a similar effect is obtained.

Because of the structure described so far, the three blade members 3 are supported as follows. The first blade member 3a is supported on the base plate 1 at the heightwise position=H1+height of the boss-like protrusion of the blade member. The second blade member 3b is supported at the heightwise position=H2+height of the boss-like protrusion of the blade member. The third blade member 3c is supported at the heightwise position=H3+height of the boss-like protrusion of the blade member. Consequently, the first through third blade members 3a-3c, respectively, are superimposed over the base plate 1 with height difference corresponding to the thickness d of each blade member. As a result, the blade members are prevented from interfering with each other.

As described so far, the base-end portions of the blade members 3 are pivotally supported on the base plate 1 with height difference corresponding to the thickness of each blade member. The front-end portions of the blade members 3 are supported as follows. In the mutual relation between the blade members 3, the front-end portion of the first blade member 3a is placed over the base-end portion of the second blade member 3b over the whole range of swinging motion as shown in FIG. 1. Similarly, the front-end portion of the second blade member 3b is located under the base-end portion of the third blade member 3c. The front-end portion of the third blade member 3c is located over the base-end portion of the first blade member 3a.

Accordingly, the position of the second blade member 3b over the first blade member 3a and the position of the third blade member 3c over the second blade member are restricted to prevent the order of overlap of the first through third blade members 3a, 3b, and 3c from being perturbed over the whole swinging motion across the aperture 2 in the optical path.

Figure 3:
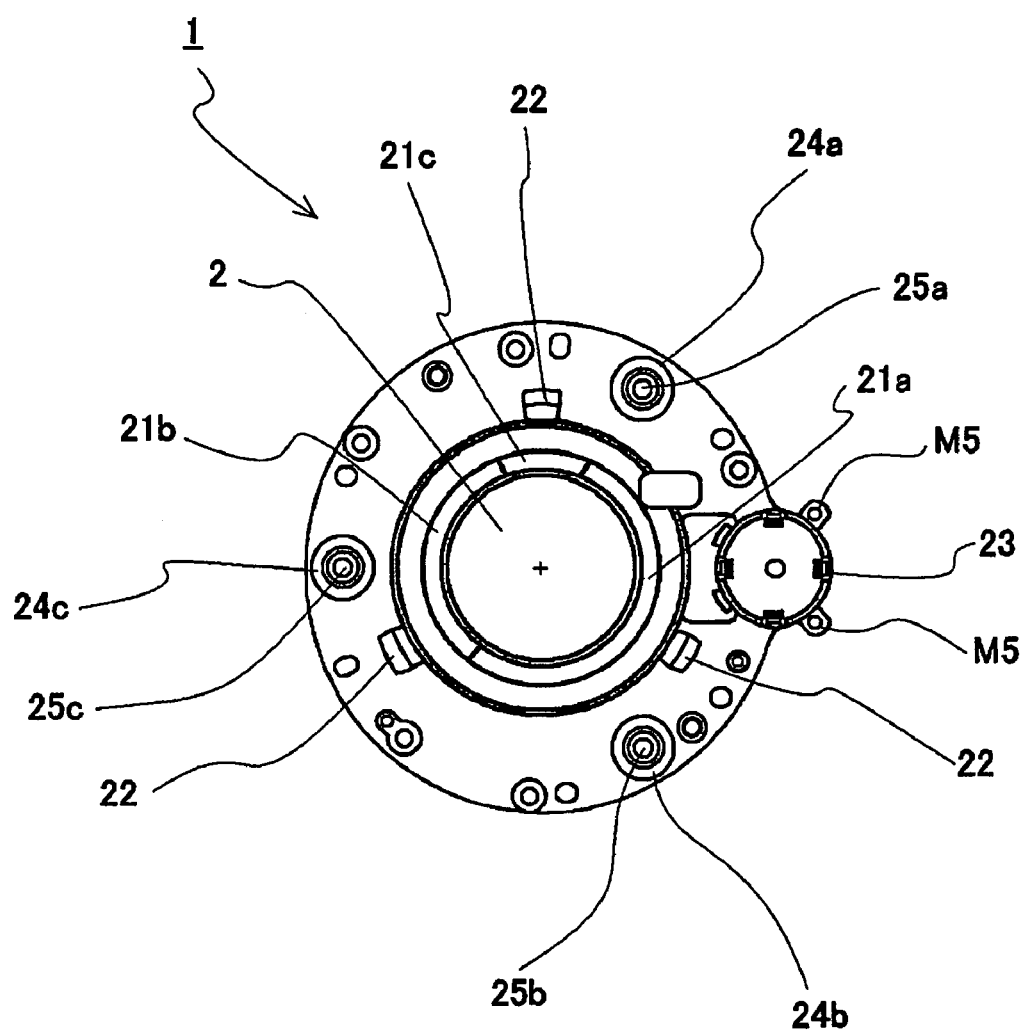
FIG. 3 is a plan view of the base plate of the device shown in FIG. 1.

The aperture flange 21 protruding in the direction of the optical axis as described above is formed in the aperture 2 in the optical path. Steps are formed on the flange 21 in the peripheral direction as shown in FIGS. 1, 6-1A-6-1C, and 6-2D-6-2F. The steps form a guide surface 21a for slidably guiding the front-end portion of the first blade member 3a over the whole region of the swinging motion of the first blade member 3a, a guide surface 21b for slidably guiding the front-end portion in the range of swinging motion of the second blade member 3b, and a guide surface 21c for slidably guiding the front-end portion in the range of the swinging motion of the third blade member 3c as shown in FIG. 3. The steps are so formed that the guide surface 21b is higher than the height of the guide surface 21a in the direction of the optical axis by an amount equal to the thickness d of the blade member and that the guide surface 21c is higher than the guide surface 21b.

Figure 4:
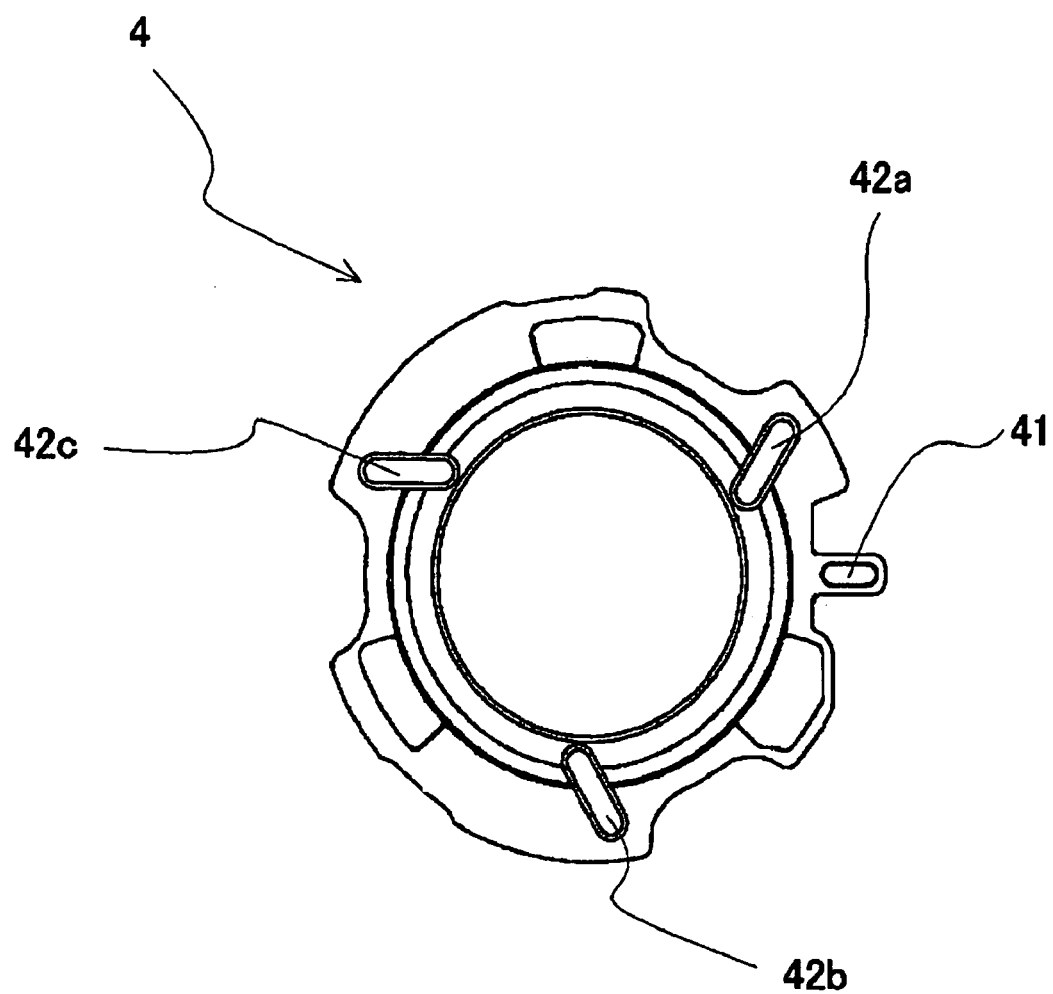
FIG. 4 is a plan view of the transfer ring of the device shown in FIG. 1.
Figure 5:
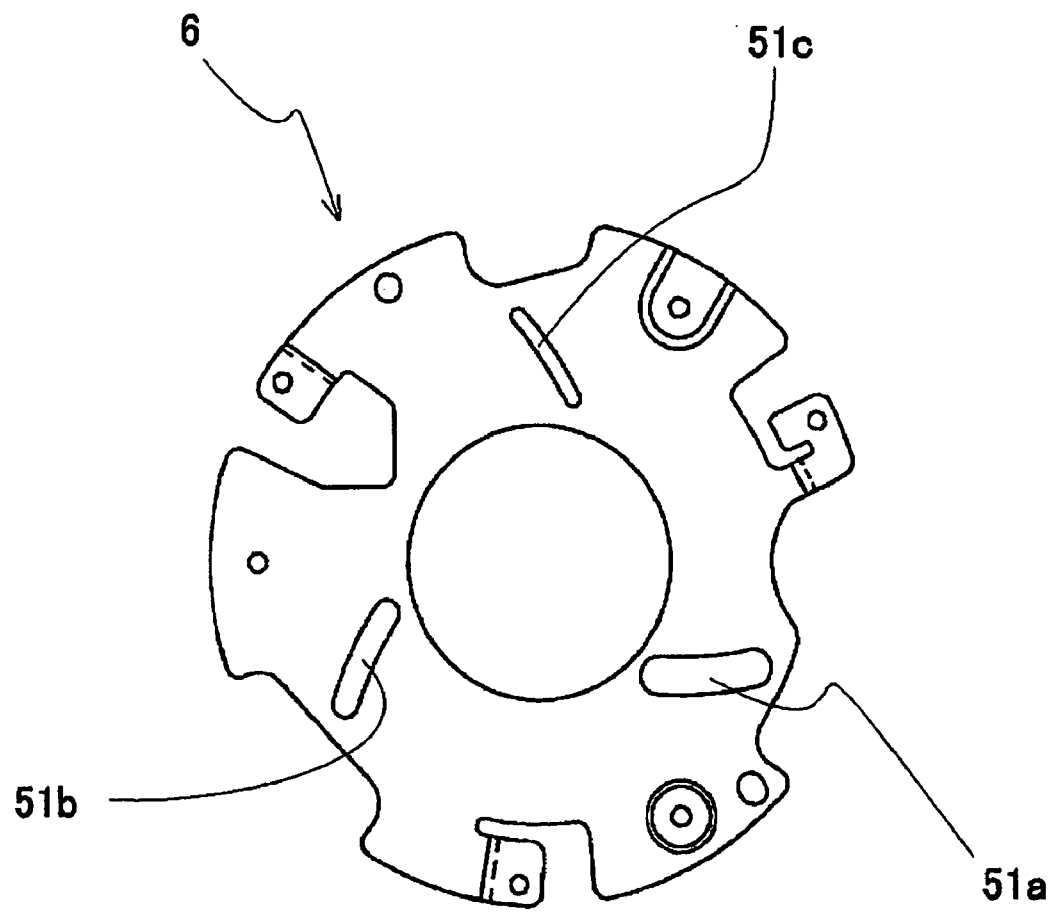
FIG. 5 is a plan view of the holding plate of the device shown in FIG. 1.

The blade members 3 engage the transfer ring 4 in the manner described below. The transfer ring 4 is securely supported on the protrusions 22 formed on the base plate land held so as to be rotatable about the optical axis X-X. The slit groove 41 in which the transfer pin M9 of the driving motor M is fitted is formed at one end of the ring. Tilted slit grooves 42a, 42b, and 42c (see FIG. 4) corresponding to the blade members 3a, 3b, and 3c are formed in the transfer ring 4.

Pins 35a, 35b, and 35c stand upright from illustrated central portions of the blade members 3a, 3b, and 3c, respectively. A flanged step surface of 35° is formed at the base portion of each pin 35. Flanges with which the step surfaces of 35° of the pins engage are formed in the tilted slit grooves 42a, 42b, and 42c. Especially, the height of the flange portion of the slit groove 42a in which the pin 35a of the blade member 3a is engaged is set equal to the height H1 of the boss-like protrusion 24a. The height of the flange portion of the slit groove 42b in which the pin 35b of the blade member 3b is engaged is set equal to the height H2 of the boss-like protrusion 24b. The height of the flange portion of the slit groove 42c in which the pin 35c of the blade-member 3c is engaged is set equal to the height H3 of the boss-like protrusion 24c.

Therefore, the first through third blade members 3a, 3b, and 3c are supported at the same heightwise position to the boss-like first protrusions 24, slit grooves 42, and flanges 21 in the aperture 2 in the optical path, the base-end portions of the first protrusions 24 being formed on the base plate 1.

Figures 1A, 6:
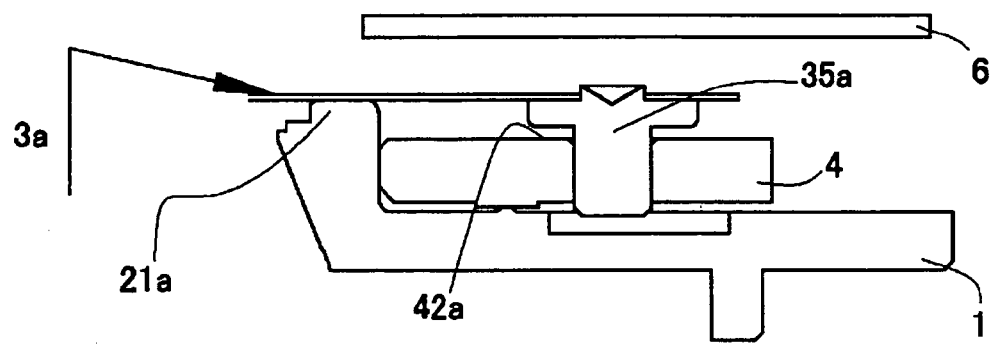
FIG. 6-1A is a cross section of one first blade member and the transfer ring of the device shown in FIG. 1, showing the manner in which the first blade member is coupled to the transfer ring.
Figures 1B, 6:
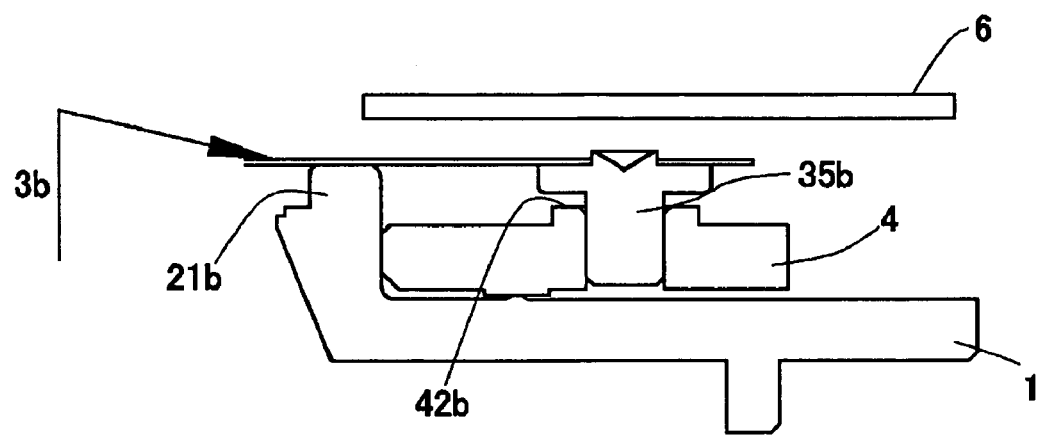
Figures 1C, 6:
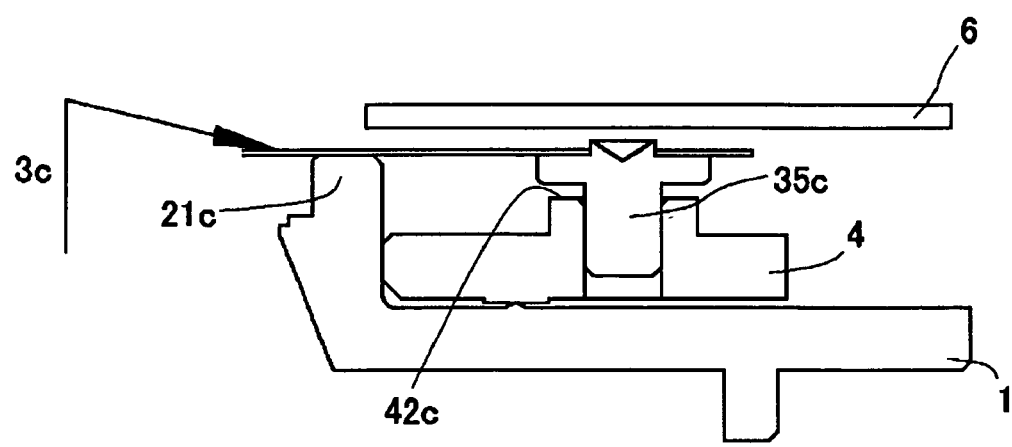
Figures 2D, 6:
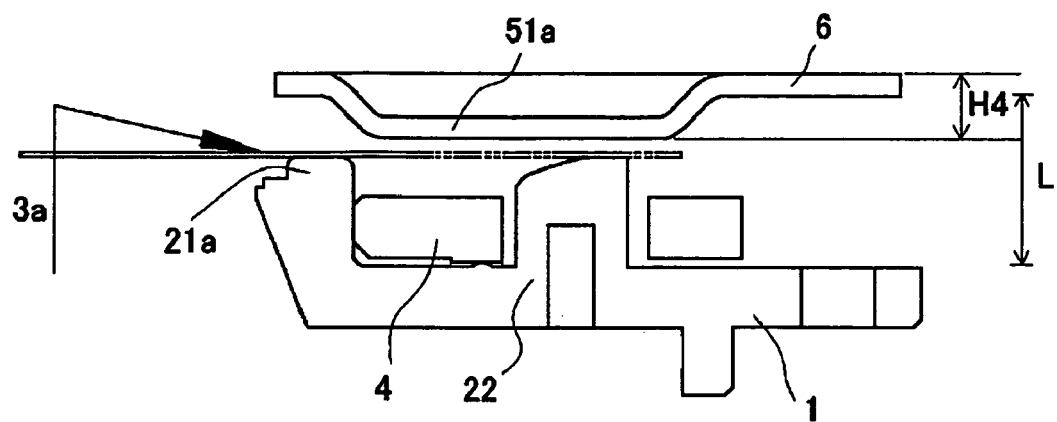
Figures 2E, 6:
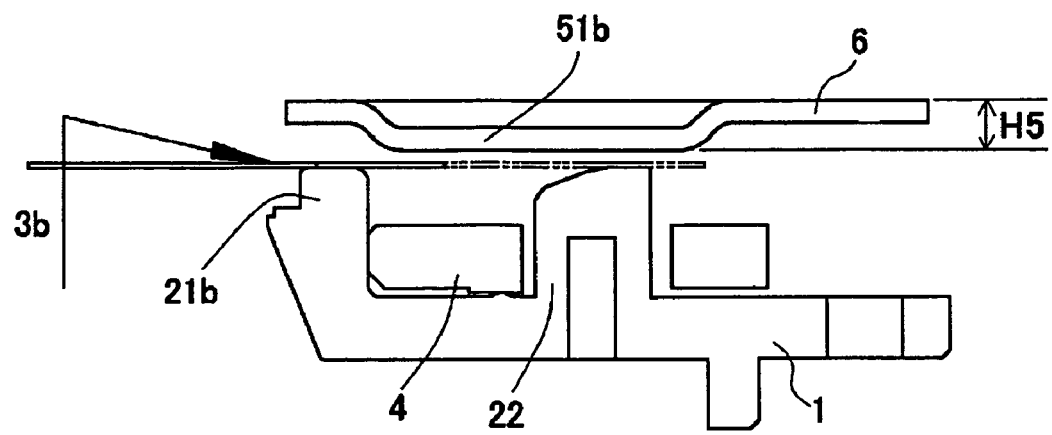
Figures 2F, 6:
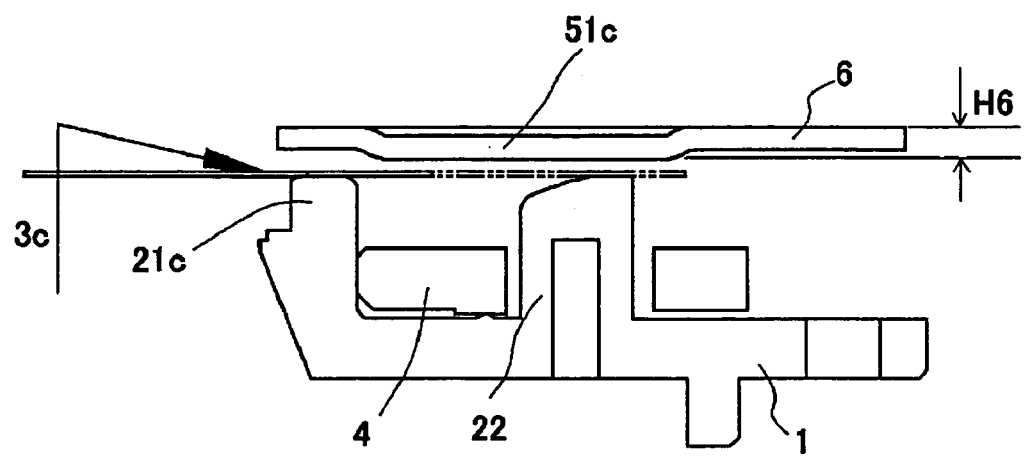

The rib-like protrusions 51a, 51b, and 51c are formed on the holding plate 6 to support the blade members 3 in the range of swinging motion. The heightwise positions of the rib-like protrusions 51a-51c are determined as shown in FIGS. 6-1A-6-1C and 6-2D-6-2F. As shown in FIG. 6-2D, the height of the rib-like protrusion 51a is set to H4 to support the first blade member 3a between the base plate 1 and the protrusion 51a in the region of swinging motion of the first blade member 3a. Because of the convenience of drawing the figure, the protrusion is shown to be spaced from the surface of the blade member. Preferably, the protrusion is in abutment with the surface, or a slight gap is left between them. In FIG. 6-2E, the height of the rib-like protrusion 51b formed in the region of swinging motion of the second blade member 3b is set to H5. The gap with the surface of the blade member is the same as the gap described above. In FIG. 6-2F, the rib-like protrusion 51c is formed in the region of swinging motion of the third blade member 3c, and the height of the protrusion 51c is set to H6. The gap with the surface of the blade member is the same as the foregoing gap. As is obvious from the description provided thus far, the heights satisfy the relationship $$H4>H5>H6$$

The difference between the two adjacent heights is set substantially equal to the thickness of each blade member.

The assembly sequence of the various components described above is next described by referring to FIG. 1. The aperture 2 in the optical path is formed in the base plate 1. The aperture flange 21, the boss-like first protrusions 24a, 24b, 24c, and the coil frame M1 of the driving motor M are formed integrally with the base plate 1. An appropriate number (three in the illustrated example) of mounting stems M5 stand upright from the base plate 1. The holding plate 6 (described later) is fixedly mounted to the stems M5 by screws. The transfer ring 4 is rotatably and securely held to the protrusions 22 formed on the base plate 1. The blade members 3 are mounted on the transfer ring 4.

The base-end portions of the blade members 3a, 3b, and 3c are supported on the boss-like first protrusions 24a, 24b, and 24c formed on the base plate 1. The pins 35a, 35b, and 35c standing upright from the blade members 3a, 3b, and 3c, respectively, are inserted into the slit grooves 42a, 42b, and 42c, respectively, in the transfer ring 4. The front-end portions of the blade members 3a, 3b, and 3c are placed and supported on the guide surfaces 21a, 21b, and 21c, respectively, of the aperture flange 21. The holding plate 6 is fixedly mounted with screws to the stems M5 mounted on the base plate 1. With respect to each of the first through third blade members 3a, 3b, and 3c supported in this way, the base-end portion, center portion, and front-end portion are supported to the boss-like first protrusion 24, flange of the slit groove 42, and aperture flange 21, respectively, such that they differ in heightwise position in the direction of the optical axis X-X.

MODIFICATION OF EMBODIMENT

Figure 8:
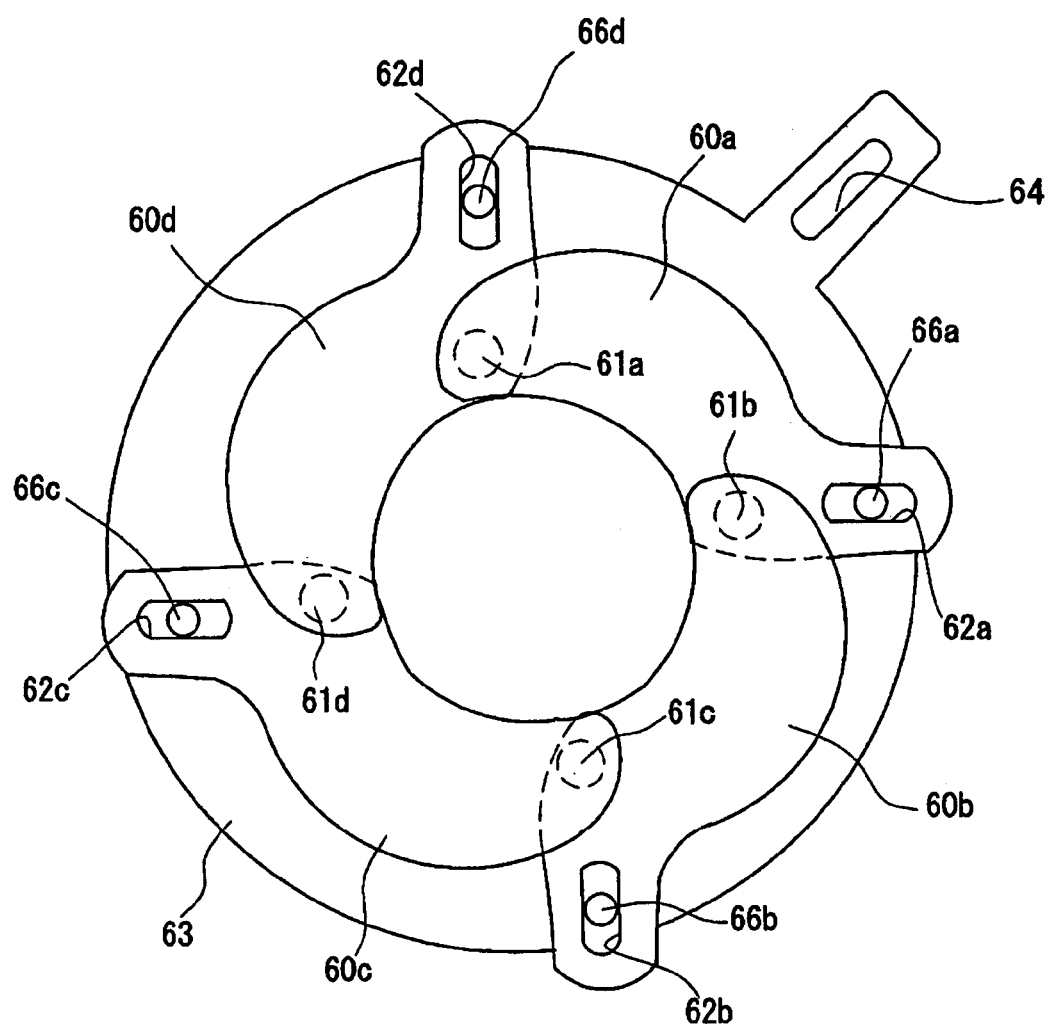
FIG. 8 is a plan view of a light amount-adjusting device different in form from the device shown in FIG. 1, showing the structure of the blade members.
Figure 9:
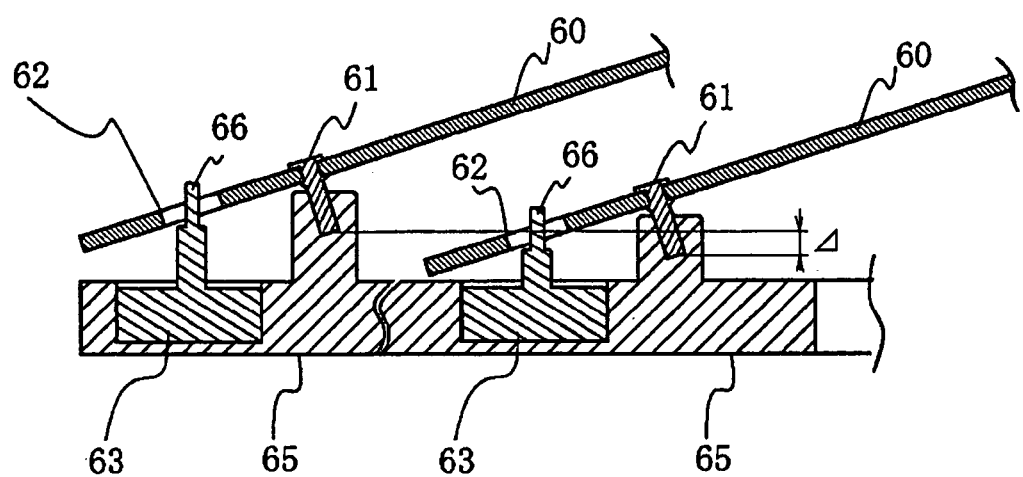
FIG. 9 is a cross section of a structure for supporting the blade members of the device shown in FIG. 8.

A light amount-adjusting device shown in FIG. 8 maintains the order of overlap of the blade members by the tilt of the blade members as shown in FIG. 9. In the same way as in the above-described embodiment, four blade members 60a, 60b, 60c, and 60d are arranged at equal intervals on a base plate 65 having an aperture in the optical path. A transfer ring 63 is rotatably built in the base plate 65. Engagement slits 62a, 62b, 62c, and 62d are formed in the base-end portions of the blade members 60. Transfer pins 66a, 66b, 66c, and 66d mounted on the transfer ring 63 are fitted in the engagement slits 62a, 62b, 62c, and 62d, respectively.

The blade members 60a, 60b, 60c, and 60d are rotatably held by shaft pins 61a, 61b, 61c, and 61d, respectively, standing upright from the base plate 65. The blade members 60a-60d are supported by the transfer pins 66a-66d on the transfer ring 63 and by the shaft pins 61 on the base plate 65 so as to be tiltable through a given angle. The base plate has protrusions which are different in height. The difference between the heights of the protrusions is given by Δ. A slight gap is left between any two adjacent front-end portions of the overlapping blade members by tilting the blade-members 60 through the given angle and forming the height differences in this way. If the front-end portions deform slightly, no interference occurs. That is, the front-end portions of the blade members 60 arranged on the base plate 65 are placed over the base-end portions of the adjacent blade members 60 and so the overlapping portions are restricted up and down by tilting the blade members 60. The swinging motions of the blade members are prevented from interfering with each other.

Figure 10:
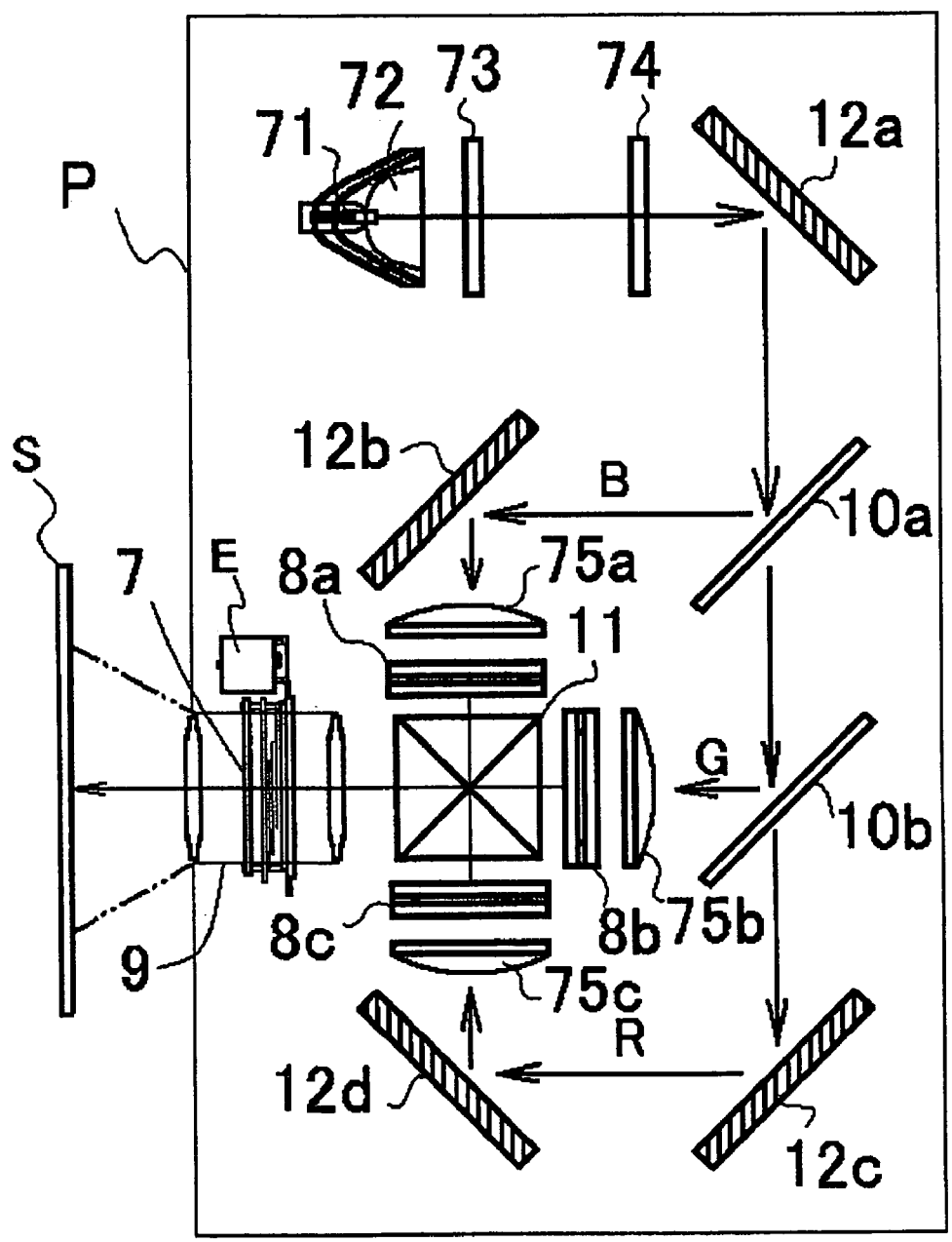
FIG. 10 is a schematic diagram of a projector unit incorporating the device of FIG. 1.

The structure of a projector unit using the aforementioned light amount-adjusting device is next described by referring to FIG. 10. The projector unit has a casing in which a light source, a spectrally splitting portion, an imaging portion, an image data portion, and a projector portion are mounted. The spectrally splitting portion spectrally splits the light from the light source into the three primary colors of R, G, and B. The imaging portion creates an image based on a signal from the image data portion. The projector portion projects light that is directed from the spectral portion to the imaging portion. The light amount-adjusting device is mounted within the casing and located between the light source and the spectrally splitting portion.

The components of the projector unit are described. The image entered into the projector can take various forms such as RGB signals, component signals, high-definition signals, and video signals. For example, an RGB signal is used when a signal is sent from the image output terminal of a computer to the projector unit. A component signal couples the output terminal of a DVD player to the projector unit. A high-definition signal couples the output terminal of a tuner of a high-definition TV set to the projector unit. A video signal couples the output terminal of a video cassette recorder to the projector unit. The projector unit is known in various forms. One example of the projector unit is shown in FIG. 10, which shows the layout of the projector unit in which a liquid crystal panel is used as the imaging portion.

Referring to FIG. 10, the projector is indicated by P. A screen S is used to project an image. The projector P is equipped with a light source 71 for projection. A metal halide lamp, high-pressure mercury lamp, NSH lamp, xenon lamp, or VIP lamp is used as the light source. Light emitted from the light source 71 is collected by a reflective mirror 72 at the objective plane. The light is then substantially collimated by integrator lenses 73 and 74 and converted into less spotted light.

The light passes through the integrator lens 74 that improves the efficiency of collection at a liquid crystal panel 8 and the center-to-corner ratio. The light is then bent through substantially right angles by a reflective mirror 12a. The light is split into three primary colors R, G, and B by a spectral mirror. B light is reflected and isolated by a dichroic mirror 10a that passes G light and R light but reflects only B light. The B light is then guided to a condenser lens 75a via a reflective mirror 12b. The light is then collimated, passed through the liquid crystal panel 8a, and arrives at a combining prism 11 as an image of the B light.

G light and R light are transmitted through the first stage of dichroic mirror 10a. The G light is reflected and isolated by a second stage of dichroic mirror 10b that transmits R light but reflects G light. The G light is then collimated by a condenser lens 75b, transmitted through a liquid crystal panel 8b, and arrives at the combining prism 11 as an image of G light.

The R light transmitted through the second stage of dichroic mirror 10b is guided to a condenser lens 75c via two reflective mirrors 12c and 12d. The light is collimated, transmitted through the liquid crystal panel 8c, and arrives at the combining prism 11 as an image of the R light. The three primary colors of light of R, G, and B are combined into one by the combining prism 11 and guided as a color image to a projector lens 9. The image is appropriately enlarged by the projector lens 9 and projected onto the front screen S.

The aforementioned light amount-adjusting device is built into the projector unit of the construction described above in the manner described below. The above-described projector lens 9 is made of a lens unit consisting normally of plural lenses mounted in a lens barrel. The light amount-adjusting device E is built in the lens unit. In the illustrated design, first and second (or, two) light amount-limiting means are arranged at a distance from each other in the direction of the optical axis of the projector lens 9. The first light amount-limiting means 7 is made of a base plate which is disposed in the projection optical path and which has a given aperture for limiting the light amount. The second light amount-limiting means is of the configuration already described in connection with FIG. 1.

Figure 11:
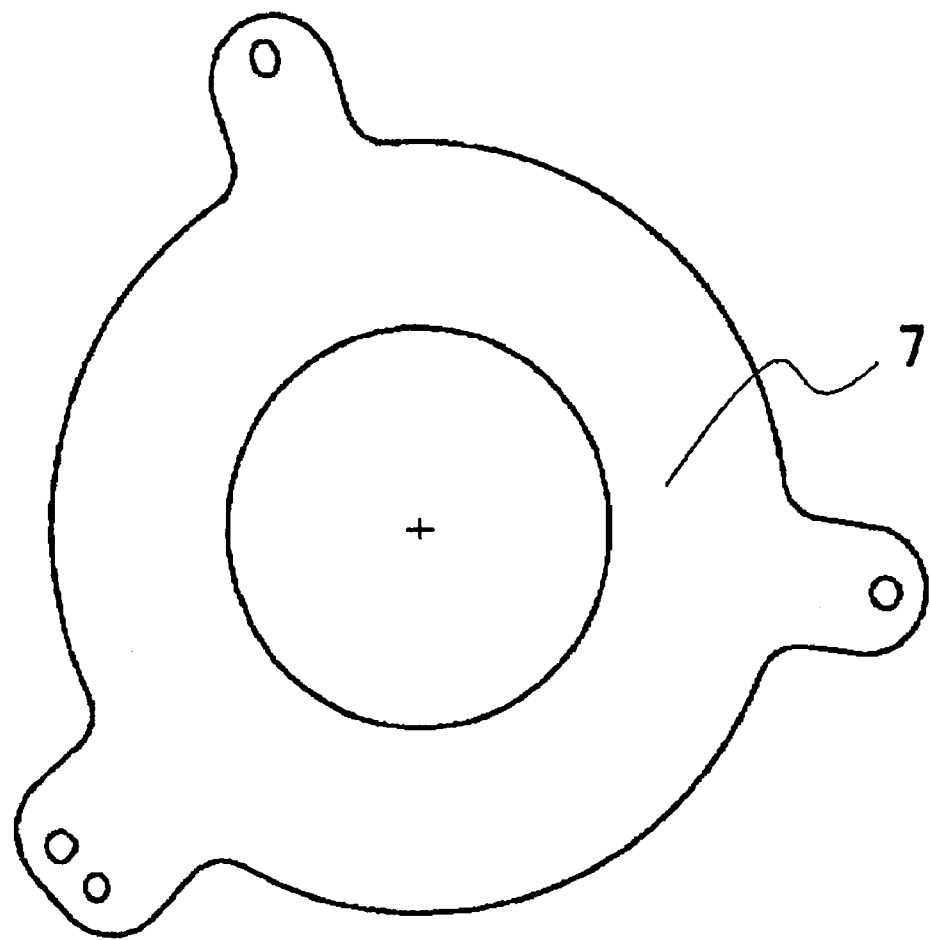
FIG. 11 is a plan view of a fixed aperture device which constitutes first light amount-limiting means and which is built in the device of FIG. 10.
Figure 12:
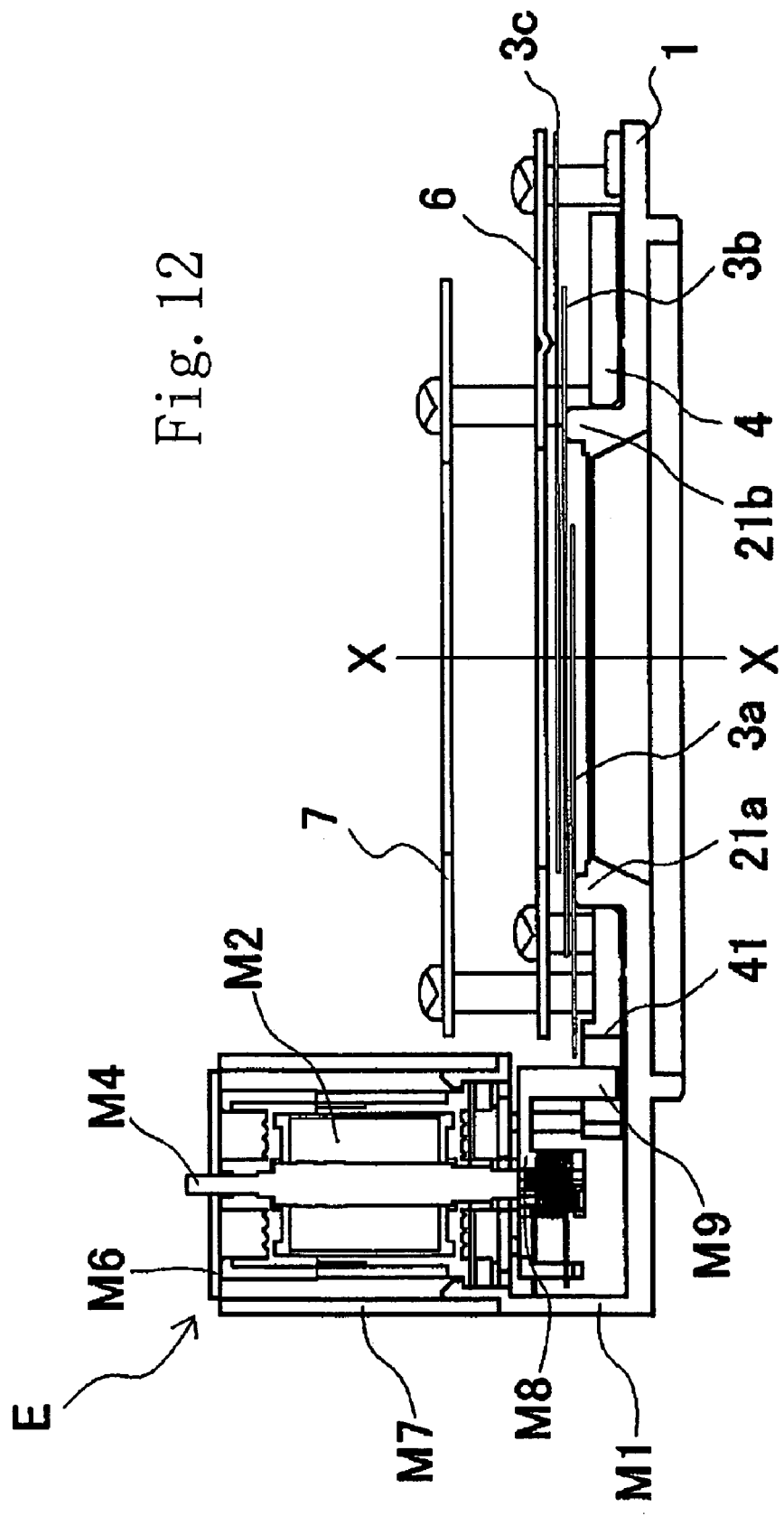
FIG. 12 is a cross section of main portions of the light amount-adjusting portion of the device shown in FIG. 10.

As shown in FIGS. 11 and 12, a fixed apertured plate 7 acting as the first light amount-limiting means is used to adjust the diameter of the aperture in the optical lens unit. As shown in FIG. 12, the fixed apertured plate 7 is mounted at a given distance from the base plate 1 of the light amount-adjusting device E. As shown in FIG. 10, the apertured plate is placed at an appropriate position inside the projector lens 9 in terms of lens optics design.

Since the first light amount-limiting means 7 is mounted at the given distance from the base plate 1, a space is formed between the base plate 1 and the first light amount-limiting means 7. Use of the space makes it possible to arrange the plural blade members 3 at appropriate intervals. The above-described light amount-adjusting device E of the invention can be obtained easily. Furthermore, the positional relationship between the fixed apertured plate 7 and the base plate 1 is determined precisely, because the fixed apertured plate 7 acting as the first light amount-limiting means is mounted to the base plate 1 of the light amount-adjusting device E. The light amount can be adjusted appropriately at the correct position.

In the invention, plural blade members including first and second blade members are disposed swingably around an aperture placed in an optical path, the aperture being formed in a base plate. At this time, first protrusions project like bosses from a surface of the base plate. Second protrusions project like bosses from surfaces of the blade members. The first and second protrusions are joined together to define the heightwise positions of the blade members in the direction of the optical axis. Also, the heightwise position of the first and second protrusions defining the heightwise position of the first blade members is made different from the heightwise position of the first and second protrusions defining the heightwise position of the second blade members. Consequently, the following advantages are acquired.

The overlapping first and second blade members are supported over the base plate at different heightwise positions. The difference in heightwise position is set equal to the thickness of each blade member. Consequently, the vertically overlapping blade members are prevented from interfering with each other. The difference in heightwise position for preventing interference is offered by rib-like protrusions projecting from the bearing portions of the blade members. This increases the mass of the base-end portions of each blade member. Hence, stable swinging motion of each blade member can be obtained.

Where ribs formed on a related art base plate are made different in height and blades are guided, the blades swing to and fro in a direction perpendicular to the direction of rotation. In the invention, the blade members can be swung at high speed without introducing such a problem. Furthermore, friction between the blade members can be prevented, as well as interference between them. Otherwise, sound in operation would produce noise.

The disclosures of Japanese Patent Applications No. 2005-165898 filed on Jun. 6, 2005, and No. 2005-165899 filed on Jun. 6, 2005, are incorporated herein.

While the invention has been explained with reference to the specific embodiments of the invention, the explanation is illustrative, and the invention is limited only by the appended claims.

What is claimed is:

1. A light amount-adjusting device comprising:
a base plate provided with an aperture in an optical path for imaging light or projected light;
at least first and second blade members, each of the blade members having a base-end portion pivotally supported on the base plate, and a front-end portion facing the aperture;
a driver for swingably opening and closing the blade members;
first and second protrusions projecting from a surface of the base plate and from a surface of the blade members, respectively, so that when the blade members are pivotally supported on the base plate, the first and second protrusions abut against each other to define a heightwise position in each of the blade members in a direction of an optical axis, said first blade member heightwise position as defined by its first and second protrusions being different from the second blade member heightwise position as defined by its first and second protrusions;
pin shaft members mounted on one of the first and the second protrusions; and
bearing holes for supporting the shaft members, formed in the other of the first and the second protrusions.

2. A light amount-adjusting device according to claim 1, wherein
the front-end portions of the first and second blade members facing the aperture in the optical path are overlapped up and down in the direction of the optical axis over the base plate, and
a difference in height in the direction of the optical axis between the first and second protrusions defining the heightwise positions of the blade members is set substantially equal to a thickness of each of the blade members.

3. A light amount-adjusting device according to claim 1, wherein
each of the blade members is a pressed-out metal plate or sheet portion; and
the second protrusions are pedestal members coupled to the base-end portions of the blade members.

4. A light amount-adjusting device according to claim 1, wherein
the base plate has a protrusive flange disposed at fringes of the aperture in the optical path, the protrusive flange supporting front ends of the first and second blade members, and a guide surface supporting central portions of the first and second blade members,
the flange has a support surface making sliding contact with the first blade member,
the guide surface has a support surface making sliding contact with the second blade member, and
the support surface of the flange and the support surface of the guide surface have steps which are different in heightwise position in the direction of the optical axis.

5. A light amount-adjusting device according to claim 1, further comprising a holding plate disposed parallel to the base plate at a given space therewith, the holding plate having rib protrusions for guiding swingable opening and closing movements of the first and second blade members, the rib protrusion for guiding the first blade member being different in heightwise position relative to the rib protrusion for guiding the second blade member.

6. A light amount-adjusting apparatus for a projector unit comprising:
an imaging device;
a light source for illuminating the imaging device with light;
a projector for projecting light from the imaging device; and
the light amount-adjusting device according to claim 1, the light amount-adjusting device capable of adjusting an amount of light from the light source according to a variation of brightness of the imaging device.

7. A light amount-adjusting apparatus according to claim 6, further comprising:
a light amount-limiter spaced from the light amount-adjusting device, the light amount-limiter being formed of a base plate placed in a projection optical path and having a predetermined aperture for limiting an amount of light, the light amount-limiter and the light amount-adjusting device being located in a lens unit forming the projector.

8. A light amount-adjusting device according to claim 1, further comprising a rotatable transfer ring supported by a periphery of the optical path aperture of the base plate, and rotated by the driver, wherein
the base-end portions of the first and second blade members are rotatably and pivotally supported on the first and second protrusions of the base plate,
the front-end portions of the blade members are swingably supported on flange protruding surfaces provided at fringes of the optical path aperture,
the shaft member of each of the blade members is integrally formed with a central portion of each of the blade members and protrudes toward the transfer ring, the shaft member having a base end-protrusion with a stepped surface, and
the transfer ring is provided with slit grooves in which the shaft members of the blade members are fitted, the slit grooves having flange protruding surfaces at fringes of the slit grooves, the flange protruding surface and the stepped surface of the base-end portion of the shaft member being slidably engaged, the flange protruding surfaces formed at the fringes of the slit grooves being so formed as to engage the first and second blade members at different heightwise positions.

9. A light amount-adjusting device according to claim 8, wherein the protrusions pivotally supporting the base-end portions of the blade members are different in heightwise position between the first and second blade members, and
the flange protruding surface located at the fringe of the aperture and slidably supporting the front-end portion of the blade members is different in heightwise position between the first and second blade members.

10. A light amount-adjusting device according to claim 9, wherein the protrusions supporting the base-end portions of the blade members, the flange protruding surfaces located at the fringes of the optical path aperture and supporting the front-end portions of the blade members, and the flange protruding surfaces located at the fringes of the slit grooves and supporting the central portions of the blade members are arranged so that the second blade member is located higher than the first blade member.

* * * * *